United States Patent [19]
Stolin

[11] Patent Number: 6,148,102
[45] Date of Patent: Nov. 14, 2000

[54] RECOGNIZING TEXT IN A MULTICOLOR IMAGE

[75] Inventor: Jacob Stolin, Cupertino, Calif.

[73] Assignee: Adobe Systems Incorporated, San Jose, Calif.

[21] Appl. No.: 08/865,021

[22] Filed: May 29, 1997

[51] Int. Cl.[7] .................................................. G06K 9/62
[52] U.S. Cl. .................... 382/164; 382/165; 382/176; 358/462
[58] Field of Search .................................. 382/164, 165, 382/162, 173, 176; 358/462, 464

[56] References Cited

U.S. PATENT DOCUMENTS

| | | | |
|---|---|---|---|
| 4,414,635 | 11/1983 | Gast et al. | |
| 5,488,670 | 1/1996 | Suzuki et al. | 382/165 |
| 5,818,953 | 10/1998 | Queisser et al. | 382/165 |
| 5,848,185 | 12/1998 | Koga et al. | 382/173 |
| 5,933,249 | 8/1999 | Shimura et al. | 382/176 |
| 5,933,524 | 8/1999 | Schuster et al. | 382/173 |

OTHER PUBLICATIONS

Q. Huang, B. Dom, D. Steele, J. Ashley, W. Niblack; Foreground/Background Segmentation Of Color Images By Integration Of Multiple Cues; IEEE, Los Alamitos, CA (1995); pp. 246–249.

E.B. Saff, A.B.J. Kuijlaars; Distributing Many Points On A Sphere; Springer Verlag, New York, vol. 19, No. 1 (1997); pp. 5–11.

Y. Zhong, K. Karu, A.K. Jain; Locating Text In Complex Color Images; Pattern Recognition, vol. 28, No. 10, Great Britain (1995); pp. 1523–1535.

V. Wu, R. Manmatha, EM. Riseman; Finding Text In Images; University Of Massachusetts, Amherst, MA (Jan. 1997); pp. 1–32.

*Primary Examiner*—Jon Chang
*Attorney, Agent, or Firm*—Fish & Richardson P.C.

[57] ABSTRACT

A method and apparatus for recognizing text in a multicolor image stored in a computer. The image is separated into multiple blocks, and the color distributions of each of the blocks are analyzed. The blocks having two main colors are identified, and two-color blocks have similar colors are grouped into two-color zones. The two colors in each zone are converted to black and white to produce a black and white image. Text is identified in the two-color zones by performing optical character recognition of the black and white image.

24 Claims, 11 Drawing Sheets

RECOGNIZING TEXT IN A MULTICOLOR IMAGE

BACKGROUND

The invention relates to recognizing text in a multicolor image.

Text recognition techniques, such as optical character recognition (OCR), can identify text characters or objects in an image stored in a computer and convert the text into corresponding ASCII characters. An OCR program can differentiate between text objects and non-text objects (such as the background) in an image based on intensity differences between the text objects and the background. This can be accomplished when the text characters and the background are two distinct colors.

However, the task of recognizing text in a multicolor image is more difficult. For example, an image may include text characters, background, and non-text characters, such as graphical objects, having different colors. Furthermore, different blocks of text in the image may have different combinations of colors. For example, one text block may have red text against a white background and another text block may have yellow text against a black background.

SUMMARY

In general, in one aspect, the invention features a computer-implemented method recognizing text in a multicolor image stored in a computer. The image is separated into multiple blocks. Color distributions of each of the blocks are analyzed, and blocks having two main colors are identified. The two-color blocks having similar colors are grouped into two-color zones, and text in the two-color zones are identified.

Implementations of the invention may include one or more of the following features. The two colors in each zone are converted to black and white to produce a black and white image. Optical character recognition of the black and white image is performed. The image is a raster of pixels. The pixels of each block are mapped to a three-dimensional color space. For each two-color block, a cylinder is defined that encloses the pixels, the cylinder having a height and a radius. A block is classified as a text block if the ratio of the radius to the height is less than a predefined value. The text identifying step is performed in the text blocks. The predefined value is approximately 0.35. Each block is represented as a vector in a three-dimensional color space. The vector originates at a point in a first group of pixels corresponding to a first color and terminates at a point in a second group of pixels corresponding to a second color. Clusters of vectors that point generally in the same directions are identified. Blocks corresponding to clusters that contain more than a predefined number of vectors are marked as text blocks. The cluster-identifying step includes defining sample points on a sphere in a 3-dimensional color space. Further, a local maximum of a predefined function is identified. The vectors within a predetermined angle of the sample point are grouped into a cluster. The sample points are uniformally distributed on the sphere.

In general, in another aspect, the invention relates to a computer program residing on a computer-readable medium for recognizing text in a multicolor image. The computer program includes instructions for causing the computer to separate the image into multiple blocks. Color distributions of each of the blocks are analyzed, and blocks having two main colors are identified. Two-color blocks having similar colors are grouped into two-color zones, and text in the two-color zones are identified.

In general, in another aspect, the invention features an apparatus to recognize text in a multicolor image. The apparatus includes a storage medium to store the image, and a processor operatively coupled to the storage medium and configured to separate the image into multiple blocks. Further, color distributions of each of the blocks are analyzed. Blocks having two main colors are identified, and two-color blocks having similar colors are grouped into two-color zones. Text in the two-color zones are identified.

Among the advantages of the invention are one or more of the following. Text characters in a multicolor image can be recognized and converted to ASCII format. Portions of the image that contain non-text data, such as graphical objects, are identified and not provided to the text recognition and conversion process.

Other features and advantages of the invention will become apparent from the following description and from the claims.

DETAILED DESCRIPTION

In a multicolor image that contains differently colored text and non-text objects, it is likely that portions of the image that contain text include primarily two colors—a background color and a text (or foreground) color. The other portions of the image either contain a larger variety of colors (such as those portions containing graphical objects) or a single color (such as in the borders of the image). To recognize the text in the image, two-color portions of the image are first identified.

Figure 1:
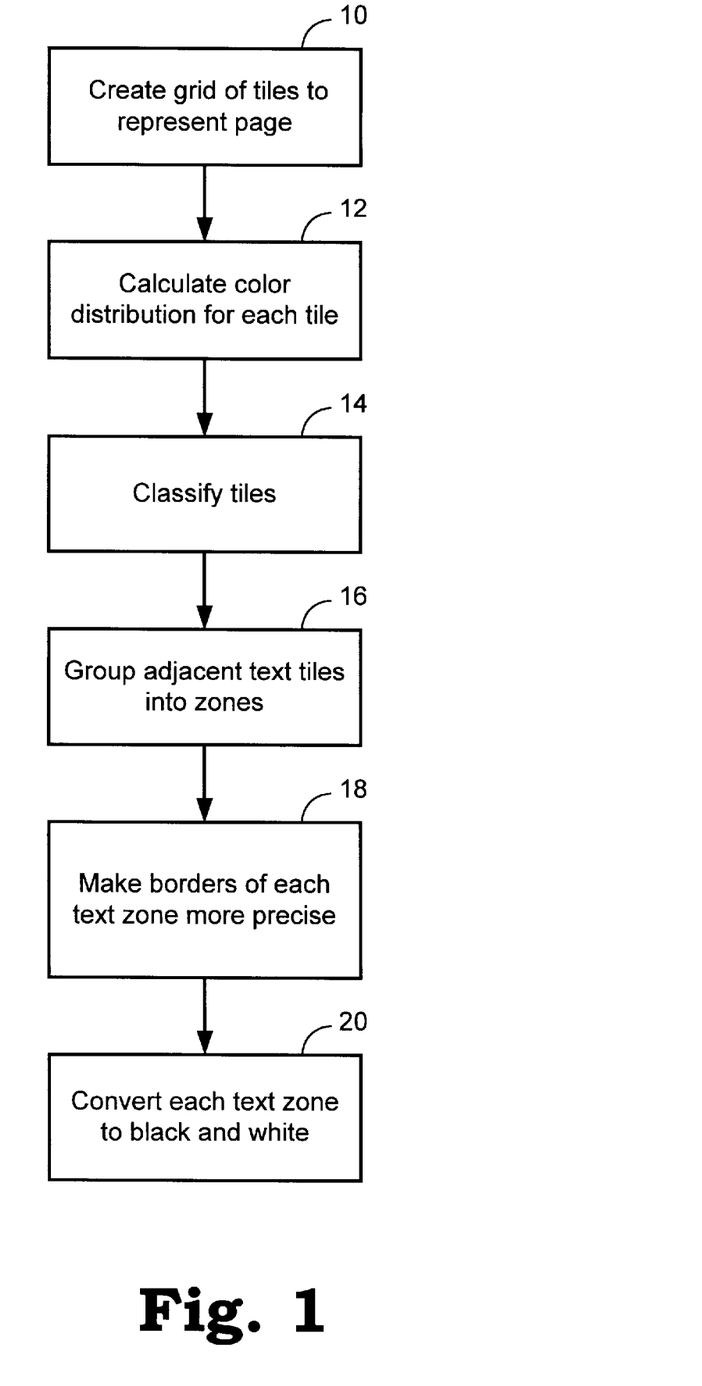
FIGS. 1 and 2 are flow diagrams of a process of recognizing text in a multicolor image in accordance with the present invention.

Referring to FIG. 1, a computer-implemented text recognition program detects text zones inside a multicolor image represented as a raster of pixels and converts the text zones into black and white zones to enable use of conventional OCR techniques. In this description, the exemplary image processed by the program is a page, e.g., a page scanned by a color scanner.

Each page is initially divided at step 10 into a grid of tiles, and the color distribution of the pixels in each tile is analyzed at step 12. Based on their color distributions, the tiles are then classified at step 14. Classifications include text, monochrome, or other tiles, such as picture tiles. Tiles having the same or similar main colors are grouped into two-color text zones. Thus, for example, one text zone may have tiles in which the main colors are red and white while another zone may have yellow and blue as the main colors. Next, the borders of each of the text zones are made more precise at step 18; that is, pixels adjacent a particular zone belonging to that text zone are redefined into the zone. The program next at step 20 converts pixels in the main color groups in each text zone to black and white. The black and white zones can then be supplied to a conventional OCR process for text recognition and conversion.

Figure 2:
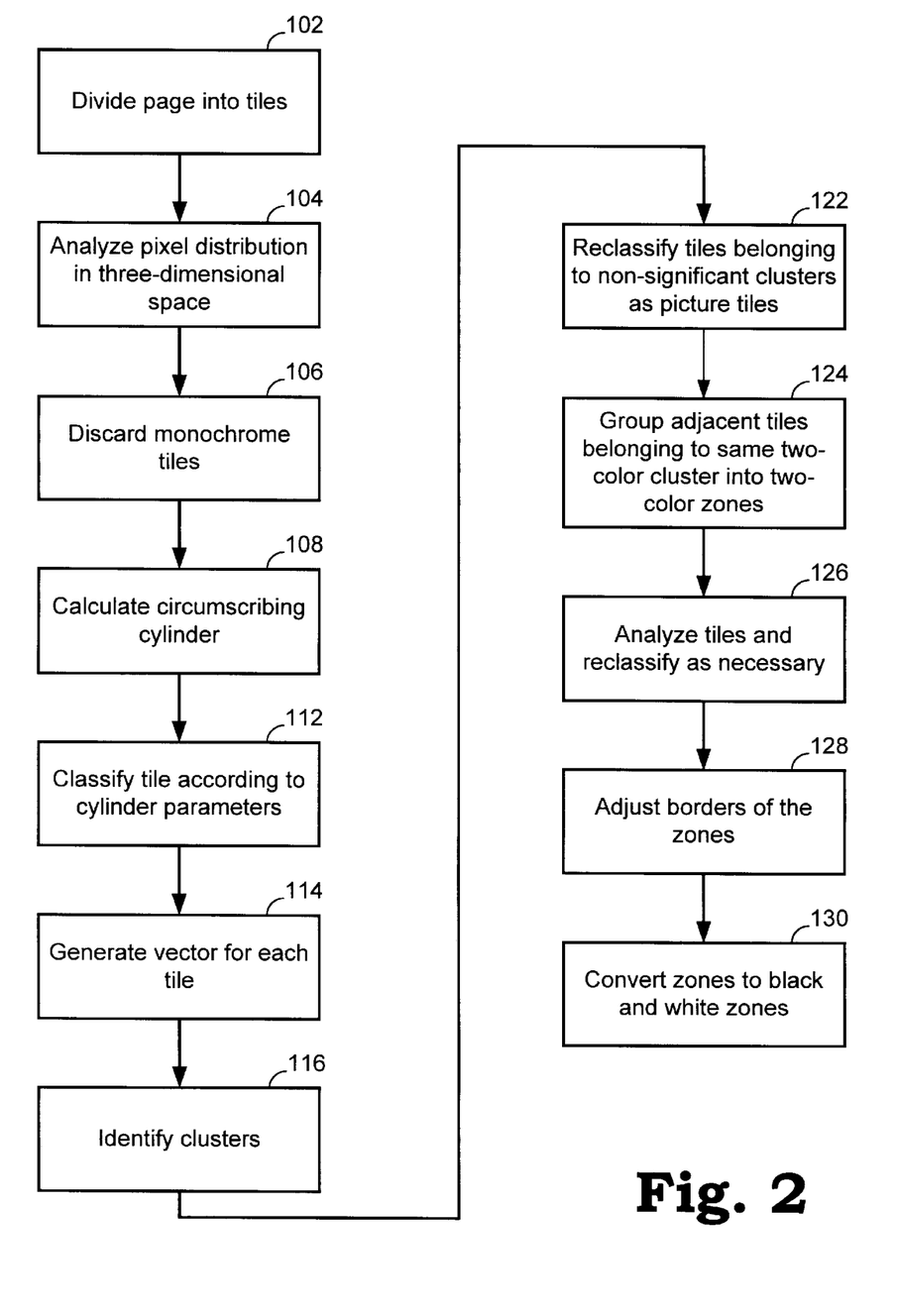

Referring to FIG. 2, the steps of the text recognition program are described in greater detail below. At step 102, the program first divides a page into a grid of tiles, with the tile size approximately twice an expected text point size, which can be preset at, for example, 12 point. Other values can also be used. The program may provide a user interface option to enable user selection of the expected point size.

Next, at step 104, the color distribution of the pixels in each tile is analyzed in a three-dimensional color space (such as the RGB space). By way of example, in the RGB space, any given pixel PX in the tile can have a value between zero and 255 along each of the R or red axis, G or green axis, and B or blue axis. The values of the pixel along the R, G, and B axes define the color associated with that pixel.

To reduce computation complexity, the program subdivides each tile into 8×8 cells (i.e., cells of eight pixels by eight pixels). Thus, each tile is analyzed or processed at the cell level rather than at the pixel level. To further reduce computation requirements, a modified RGB space is defined in which each of the R, G, and B axes range in value from zero to 7.

Figure 3:
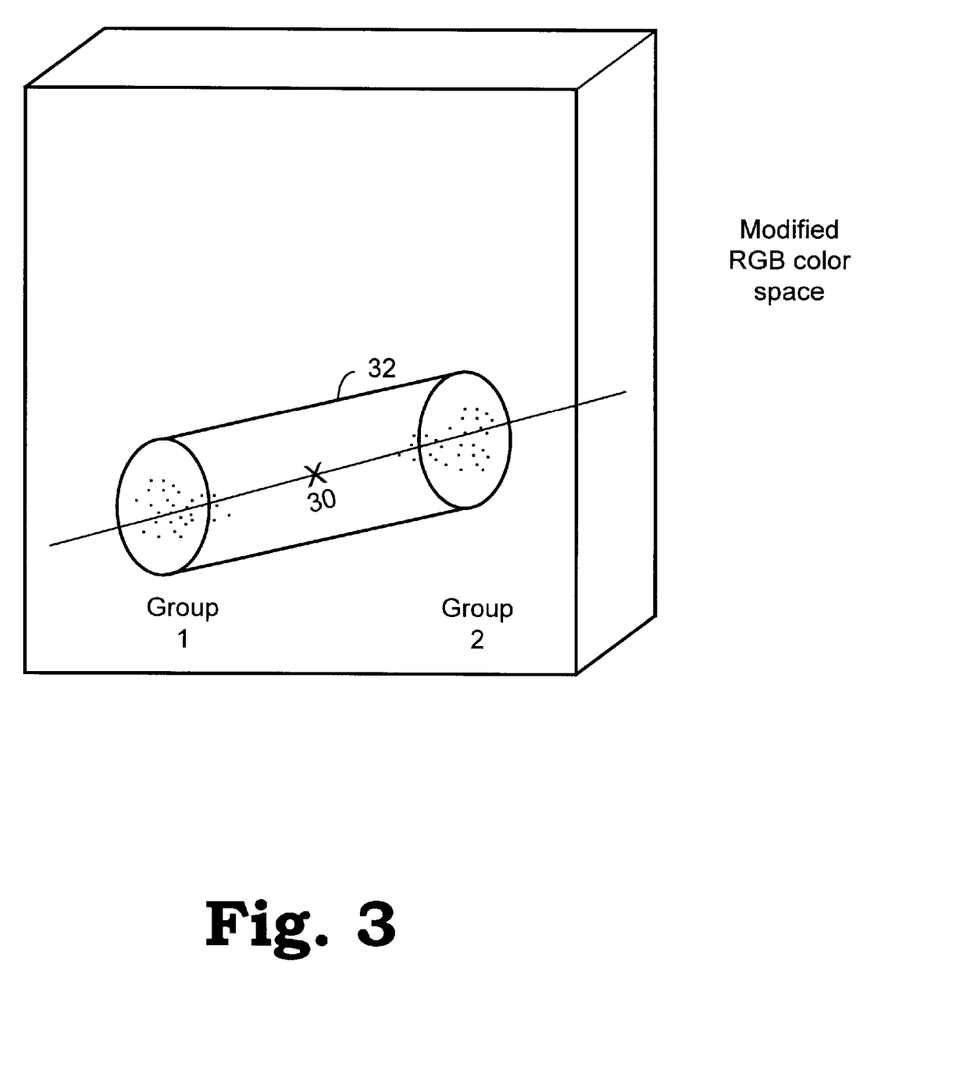
FIG. 3 is a diagram illustrating points in a three-dimensional color space representing the color distribution of one of multiple tiles in an image.

In step 104, all the cells in the tile are mapped into the three-dimensional color space to create a cloud of points, as illustrated in FIG. 3. For purposes of using the points in RGB space in the equations below, the points are represented as vectors originating at (0,0,0).

In a typical text tile, there are two main colors: the text color and the background color. Thus, for a text tile, most of the cells have values close to the value corresponding to the background color. The next largest group of cells have values close to the value corresponding to the foreground or text color. As shown in FIG. 3, a text tile has two main groups of points in RGB space, indicated as group 1 (background) and group 2 (foreground).

Next, at step 106, monochrome tiles (tiles having pixels bunched close to one particular color) are identified. Monochrome tiles are not processed further. The remaining tiles are either two-color text tiles or picture tiles. Picture tiles are tiles where the colors tend to be more dispersed.

Once all the cells of each tile have been defined in the three-dimensional color space, a certain percentage of "insignificant" cells in each tile are ignored to reduce the possibility that extraneous pixels created from errors during the scanning process would distort the text recognition process. To eliminate the insignificant cells, a circumscribing cylinder (shown as cylinder 32 in FIG. 3) is defined at step 108 in the three-dimensional color space so that all the "significant" cells are contained inside the cylinder. Thus, for example, the cylinder can be defined such that 5% of the cells in each tile are located outside the cylinder and the remaining 95% of the cells are located in the cylinder.

Figure 4:
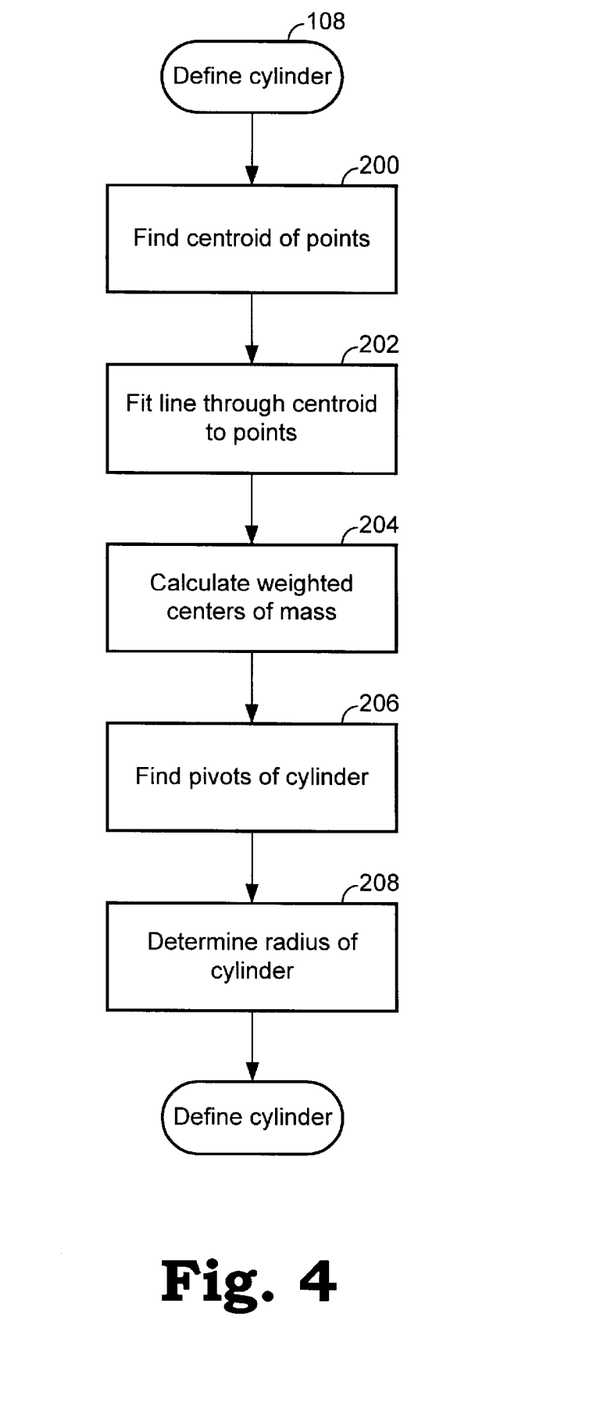
FIG. 4 is a flow diagram of a process of creating a statistically significant circumscribed cylinder in the three-dimensional color space.

Referring further to FIG. 4, which describes the step 108 of defining cylinder 32, the centroid 30 of all the points in the three-dimensional space is determined at step 200. Next, a line passing through the centroid 30 that has the least deviation from all points in the RGB space of each tile is determined by the program at step 202. One method to calculate such a line is to use the least squares method. The cylinder 32 (FIG. 3) is formed using the line as the axis. Next, at step 204, the weighted centers of mass M1 and M2 of groups 1 and 2, respectively, of the points are determined. M1 and M2 are vectors, with M1 calculated as follows:

$$M1 = \frac{\sum_{i=0}^{n}(P_i \cdot d_i^m)}{\sum_{i=0}^{n} d_i^m} \quad \text{(Eq. 1)}$$

where $P_i$ represents a point (corresponding to each cell) in group 1, n is the number of points in group 1, $d_i$ is the scalar distance between $P_i$ and the centroid 30, and m is an integer selected to emphasize the more distant points. For example, m can be greater than one, such as 2, 4, or 6, as well as a fractional value.

M2 is calculated as follows:

$$M2 = \frac{\sum_{i=0}^{l}(Q_i \cdot r_i^m)}{\sum_{i=0}^{l} r_i^m} \quad \text{(Eq. 2)}$$

where $Q_i$ represents a point in group 2, l is the number of points in group 2, and $r_i$ is the scalar distance between $Q_i$ and the centroid 30.

Thus, the centers of mass are weighted in the sense that the more distant points are emphasized by selecting an appropriate value for m, as discussed above.

Next, the two ends of the cylinder are determined at step 206. The ends of the cylinder are located in the planes (perpendicular to the cylinder axis) containing the weighted centers of mass M1 and M2. By weighting the points M1 and M2 as performed in Eqs. 1 and 2, the ends of the cylinder are defined to be farther apart from each other. Because the program uses cells each containing 64 pixels, the effective color of each cell is the average of all the pixels in that cell. Therefore, the cells tend to have colors that are closer to the center 30. To counter this effect, the more distant points are emphasized by selecting m greater than 1.

Next, at step 208, the radius of the cylinder is defined. The value of the radius depends on the portion of the cells (e.g., 5%, 10%, etc.) that are to be disregarded. The radius is defined such that the cylinder encloses the selected fraction of the cells (e.g., 95% of the cells) in each tile.

Referring again to FIG. 2, at step 112, the cylinder parameters are used by the program to classify each of the tiles as a two-color text tile or a picture tile. A large cylinder height indicates a wide color variation between the foreground and background. The radius of the cylinder indicates the amount of fluctuation in color within each group of pixels. As a result, the smaller the radius, the smaller the amount of fluctuation in color and thus the greater the possibility that the tile includes just text and background.

The program classifies the tile as a two-color text tile if the ratio of the cylinder radius to the cylinder height is less than a predetermined value (such as 0.35). If the ratio of the cylinder radius to the cylinder height is greater than the predetermined value, the program classifies the tile as a picture tile.

At step 114, a vector $V_i$ is defined in each tile. The base of the vector is the center of mass M1 for the largest group of points (FIG. 3). The vector extends to the point representing the center of mass M2 for the second largest group of points in each tile. The program at step 116 groups vectors having similar directions into clusters. The larger (explained below) clusters have a higher probability of corresponding to text tiles, and thus those tiles remain classified as such, with the remaining tiles being classified as picture tiles.

Figure 5:
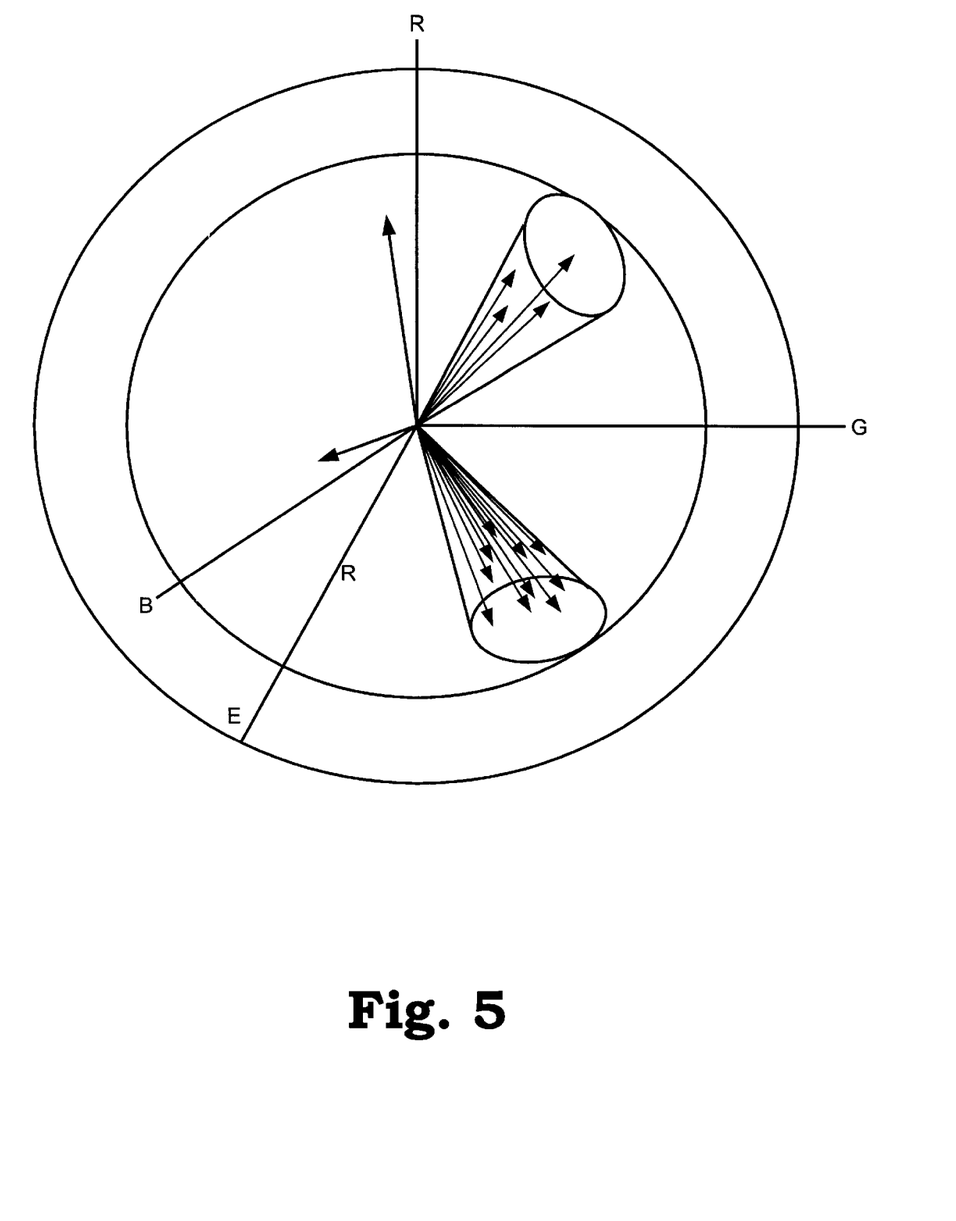
FIG. 5 is a diagram illustrating a sample sphere used to find significant clusters of vectors representing tiles of the image.

As shown in FIG. 5, significant clusters are defined as groups of vectors having at least NX (a predetermined value) vectors within any given cone having a predetermined angle $\theta_{NX}$. All other groups of vectors are considered non-significant and thus reclassified as picture tiles at step 122. A more detailed discussion of finding significant clusters of vectors is provided in connection with FIGS. 7 and 8.

Figure 6:
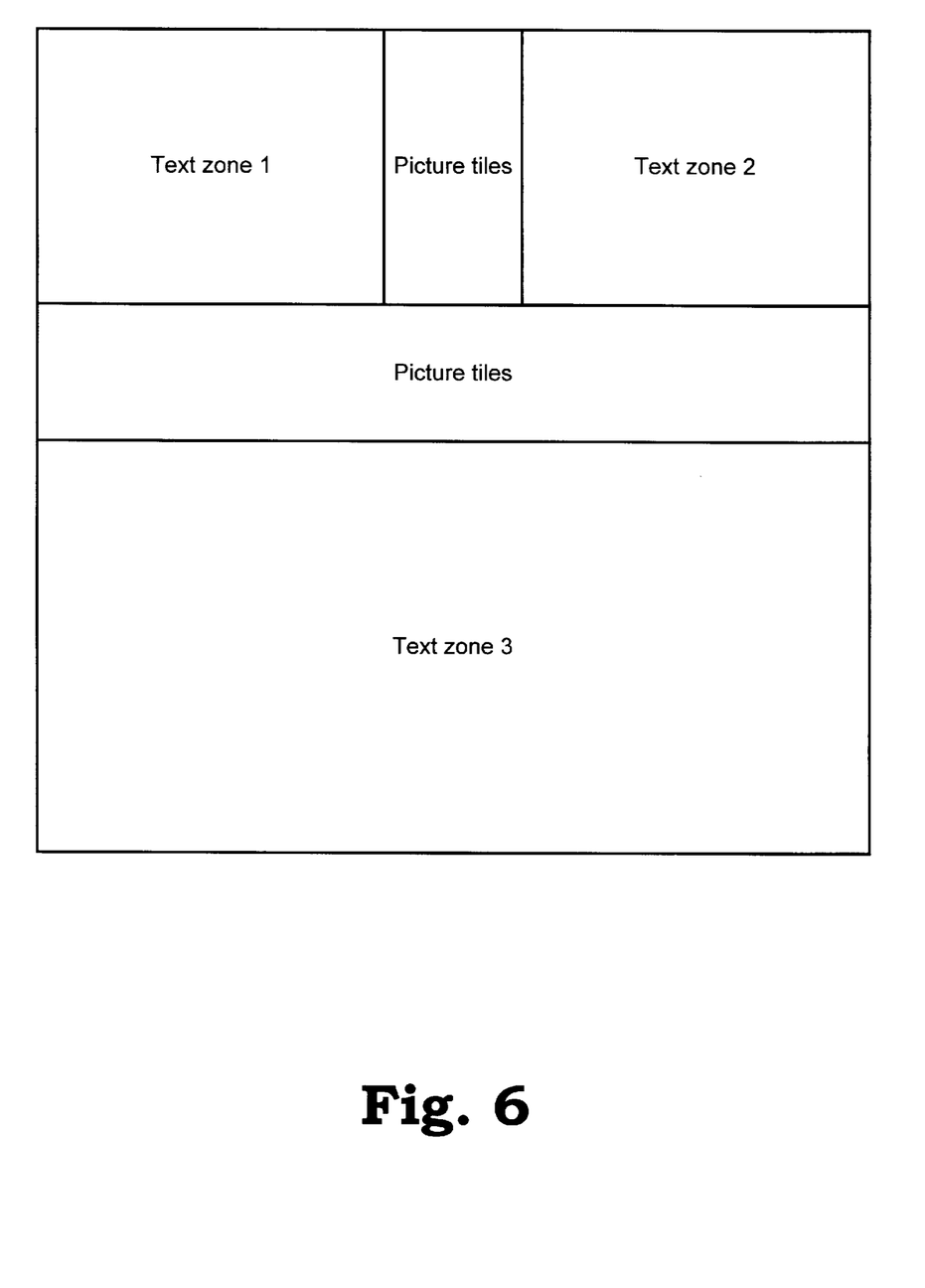
FIG. 6 is a diagram showing text zones identified in the image.

Having further reduced the number of text tiles, the program at step 124 then groups, geometrically, tiles on the page that belong to the same cluster into zones. Text tiles adjacent to each other that belong to the same cluster are grouped to a corresponding zone. FIG. 6 shows a page separated into text zones and picture tiles. Each zone is characterized by two major colors corresponding to the text and background colors. In the example of FIG. 6, there are three text zones separated by picture tiles.

After the zones have been defined, the program at step 126 analyzes each of the tiles in the context of surrounding tiles to determine if any text, picture, or monochrome tiles need to be reclassified. Thus, referring further to FIG. 11, the program determines at step 700 if a zone of the same two-color tiles surround one or just a few picture tiles, it is likely that those picture tiles should be text tiles in that zone if certain conditions are met. A picture tile is considered to be "close" to the surrounding text tiles if it corresponds to a vector that is within a cone having an angle $2\theta_{NX}$ that includes the vectors representing the text tiles. If this is true, then the picture tile is reclassified as a text tile belonging to the zone.

Figure 11:
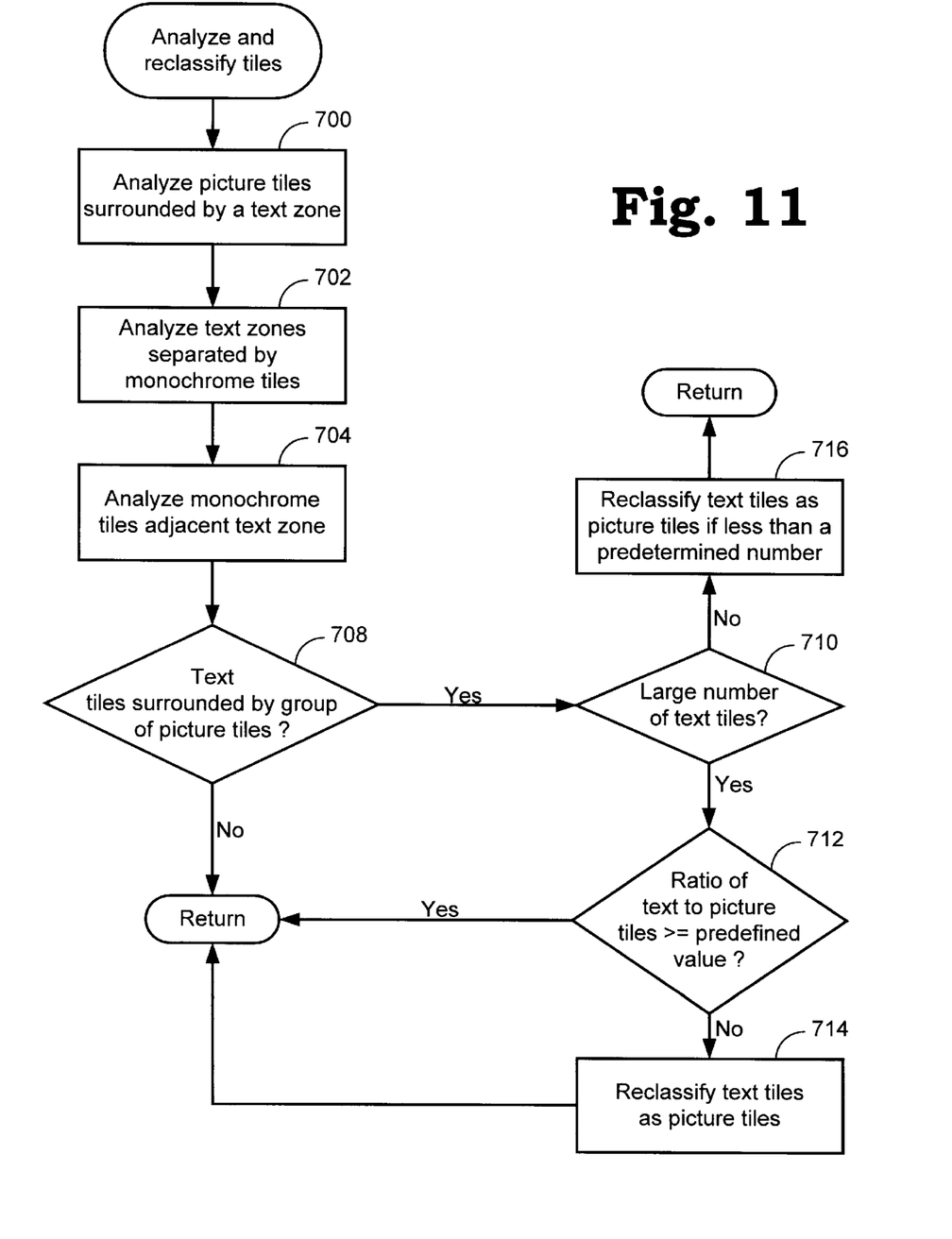
FIG. 11 is a flow diagram of a process of reclassifying tiles as necessary.

Next, at step 702, the program determines if monochrome tiles separate two zones having the same two colors. If the monochrome tiles are of the same color as the background color of the two zones, then the two zones along with the monochrome tiles are reclassified as one two-color zone.

Similarly, at step 704, if a text zone is next to a group of monochrome tiles, and the background color of the text zone is the same as the color of the monochrome tiles, then the monochrome tiles are reclassified as text tiles and included into the text zone.

Next, at step 708, the program determines if text tiles are surrounded (referred to as "surrounded text tiles") by picture tiles. If so, the program determines at step 710 if a large number of text tiles exists elsewhere in the image. If such number of text tiles exceeds half the total number of tiles in the page, then the program at step 712 determines if the ratio of the surrounded text tiles to the picture tiles is at least a threshold value, e.g., 25%. If so, the surrounded text tiles are considered significant and remain classified as text tiles. Otherwise, if the ratio is less than 25%, the surrounded text tiles are reclassified at step 714 as picture tiles.

If the number of text tiles outside the picture tiles is less than half the total number of tiles in the page, then the program checks at step 716 the number of surrounded text tiles. If the number is less than a predetermined value, e.g., 5, the program reclassifies the surrounded text tiles as picture tiles; otherwise, the surrounded text tiles remain classified as text tiles.

Referring again to FIG. 2, after the text zones have been classified, the borders of each of the two-color zones are made more precise at step 128 by including or excluding cells from adjacent picture tiles depending on their colors. Potentially, the tiles located at the edge of a text zone may contain incomplete text characters belonging to the text zone; that is, part of a text character is located in the adjacent picture tile. Thus, if the adjacent picture tile contains colors that are the same as the two colors in the text zone, then it is highly likely that those cells in the picture tile belong to the tile in the text zone. Accordingly, those cells from the adjacent picture tiles are redefined as being part of the text zone. Further, cells in the border tiles that do not belong to the zone are excluded, such as the "insignificant" cells not contained in the cylinder 32 of FIG. 3.

Next, at step 130, the foreground and background colors in each color zone are converted into black and white, respectively, to create black and white text zones. Once converted, the text zones, having known positions in the page, can be processed using conventional OCR techniques to capture text from the page.

Figure 9:
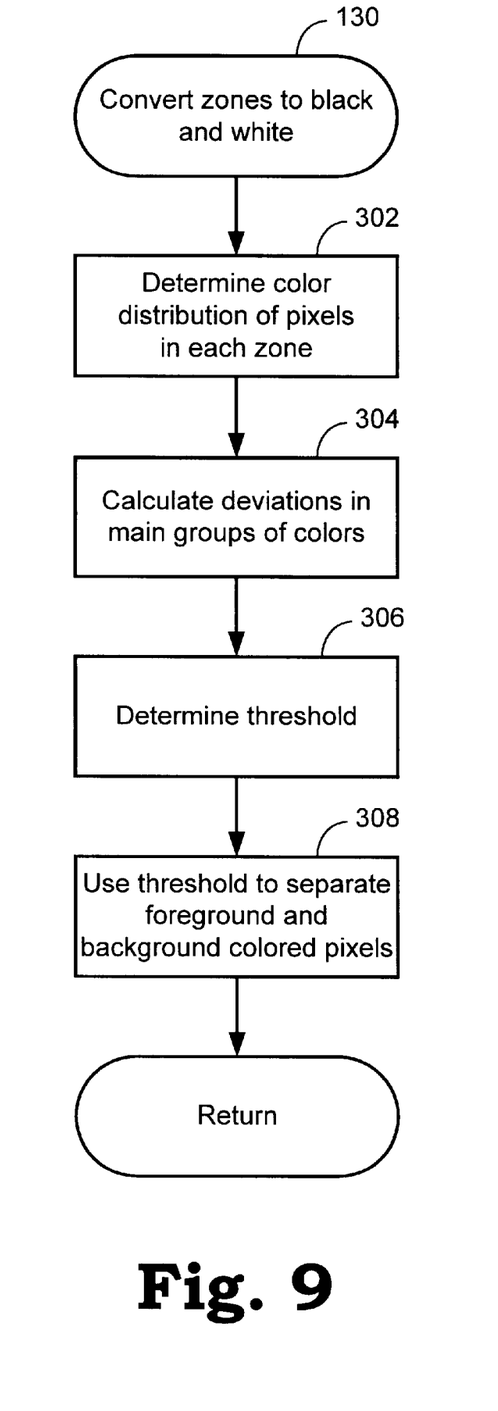
FIG. 9 is a flow diagram of a process of converting two-color zones to black and white zones.

Referring to FIG. 9, this black and white conversion process is described in more detail. First, at step 302, the color distribution of pixels (rather than the 8×8 cells used in previous steps) is determined for each text zone by mapping the pixels to the three-dimensional color (e.g., RGB) space, in which each of the axes range from 0–255. The analysis now needs to be performed at the pixel level to ensure that the individual pixels are properly grouped as background or foreground color pixels.

A simple technique to divide the pixels into one of the two groups is to use a dividing plane drawn in the middle between the two large groups of pixels. However, the distribution of pixels may not be so neatly clumped into two distinct groups, as there may be a significant number of pixels located between the two main groups of color. This may result from poor scanning of the page. Consequently, using a dividing plane in the middle to define background and foreground pixels may not produce accurate results as foreground pixels may be incorrectly marked as background pixels, and vice versa.

A better technique is to define a threshold plane that is perpendicular to a line between center points A and B of the background and foreground pixels to identify the foreground and background pixels in a particular zone.

The process described in connection with FIG. 2 to identify the weighted centers of mass is applied at the pixel level (rather than the cell level) to determine center point A and B (which are vectors in the RGB space) for the background and foreground groups of pixels, respectively, in each zone. The intersection point of the threshold plane to the line AB is proportional to the deviation of the pixels between the background and foreground colors, with the deviation calculated at step 304.

The objective is to define a threshold point T, representing the intersection of the threshold plane to line AB. Pixels $PX_i$ falling on one side of the threshold plane containing the threshold point T are in set $S_A(T)$ (background) and those on the other side are in set $S_B(T)$ (foreground). The two sets of pixels, $S_A(T)$ and $S_B(T)$, are defined mathematically as follows:

$$PX_i \in S_A(T), \text{ if } (PX_i - T) \cdot (A - T) > 0, \quad \text{(Eq. 3)}$$

$$PX_i \in S_B(T), \text{ otherwise} \quad \text{(Eq. 4)}$$

where $PX_i$ is in set $S_A(T)$ if the dot product of $(PX_i - T)$ and $(A - T)$ is greater than zero; that is, $PX_i$ projects to between points A and T on line AB.

To derive the final value of the threshold T, an iterative process is used in which an initial threshold point $T_0$ is first defined in the center between points A and B on line AB:

$$T_0 = \frac{A+B}{2}. \quad \text{(Eq. 5)}$$

All pixels between A and $T_0$ are initially defined as the background pixels (referred to as "the suggested background pixels"), and all pixels between To and B are initially defined as the foreground pixels (referred to as "the suggested foreground pixels").

The average deviation $d_A$ is then calculated for the suggested background pixels;

$$d_A = \frac{\sum_{i=1}^{K} \text{dist}(PX_i, A)}{K} \quad \text{(Eq. 6)}$$

where K is the total number of suggested background pixels, and $\text{dist}(PX_i, A)$ is the distance between a point $PX_i \in S_A(T_0)$ and A.

The average deviation $d_B$ is calculated the same way for the suggested foreground pixels.

Once $d_A$ and $d_B$ are calculated, a new threshold point $T_1$ is calculated by dividing the line AB in proportion to $d_A/d_B$:

$$T=A+d_A/d_B*(A+B). \quad \text{(Eq. 7)}$$

However, to avoid having the threshold point $T_1$ be too close to either point A or B, a ratio limit $r_0$ can be set (e.g., at 0.25). Thus, if $d_A/d_B<r_O$, then $$T_1=A+r_0*(A+B). \quad \text{(Eq. 8)}$$

If $d_B/d_A<r_O$, then $$T_1=A+(1-r_0)*(A+B). \quad \text{(Eq. 9)}$$

The threshold $T_1$ is used to divide the foreground and background pixels at step 308, and after the foreground and background pixels have been defined in each zone, they are converted to black and white pixels (black for foreground and white for background). If greater accuracy is desired, then more iterations of the process described above can be performed to calculate $T_2$, $T_3$, and so on.

Figure 7:
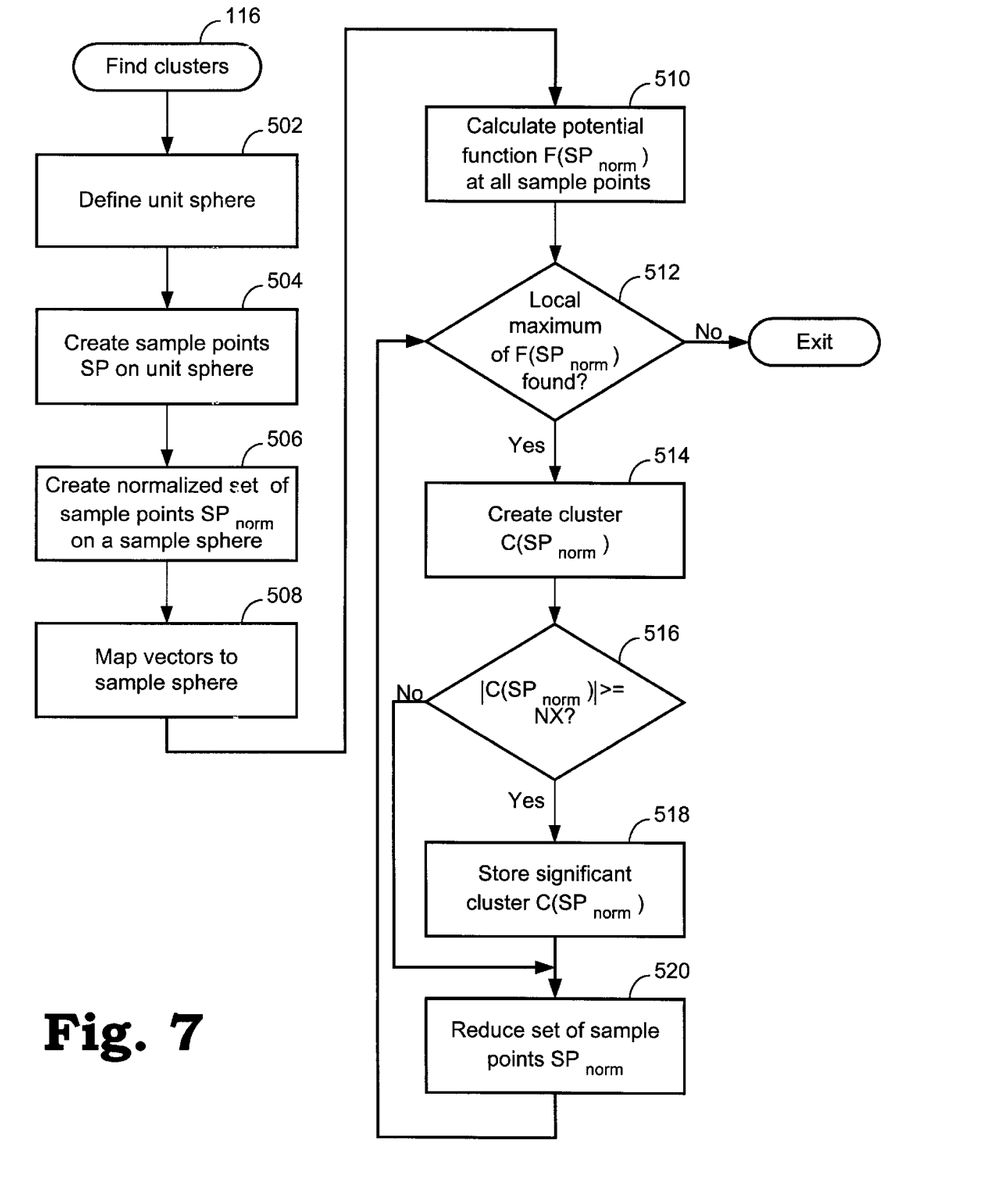
FIG. 7 is a flow diagram of a process of finding clusters of vectors representing the tiles of the image.
Figure 8:
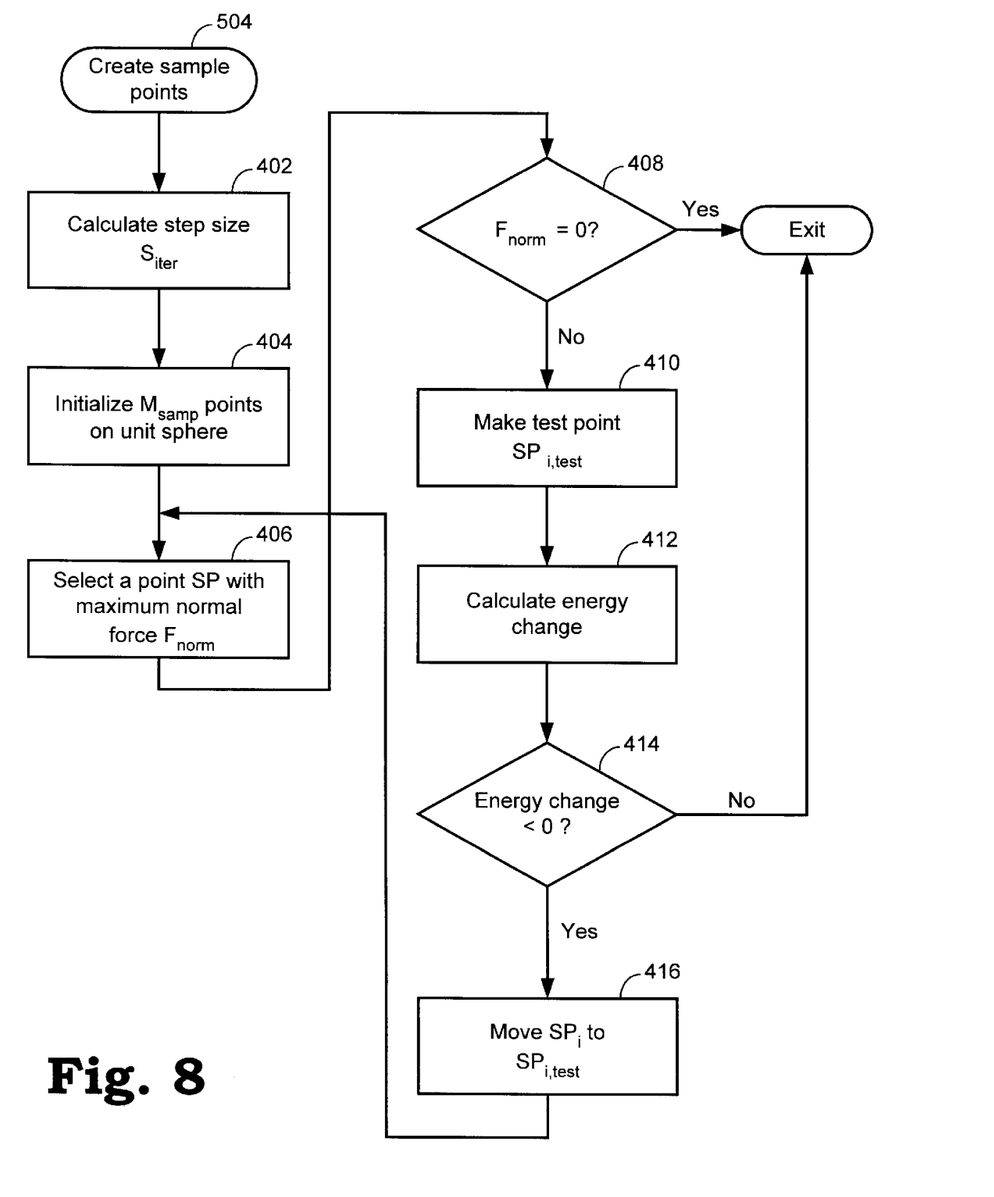
FIG. 8 is a flow diagram of a process of finding a set of uniformly distributed sample points used to determine the clusters of vectors.

Referring to FIGS. 7 and 8, the step of grouping vectors into clusters (step 116 in FIG. 2) is described in greater detail.

In FIG. 7, at step 502, a unit radius sphere (see FIG. 5) is first created in the three-dimensional color space (e.g., RGB space) on which sample points SP are defined at step 504. As described further below, these sample points are used to calculate a potential function to determine where the vectors $V_i$ representing each text tile are clustered.

The sample points can be defined to be uniformly distributed on the sphere (using an electrostatic model, as described further in connection with FIG. 8). One advantage of using properly spaced, uniformly distributed sample points is that it is less likely that local maxima of the potential function are missed. Alternatively, the sample points can be located on circular paths (spaced a predetermined angle apart) along the surface of the sphere.

Once a uniform set of sample points $SP=\{Sp_j\}$ (j=1 . . . $M_{samp}$) have been defined on the unit radius sphere, a normalized set of sample points $SP_{norm}$ is then defined at step 504, which are located on a "sample sphere" having a radius (R+ϵ). The parameter R is the radius of the original sphere (which has been defined as having a radius of 1), and ϵ is a parameter selected to prevent distortions in calculating the potential function F when the vectors $V_i$(i=1 . . . N) are located close to a sample point. The values for ϵ can range, for example, between 0.1*R and 0.2*R.

It is noted that the sample points SP and $SP_{NORM}$ can be calculated once and stored. The stored sample points can then be repeatedly used to avoid recalculating the sample points for each image processed.

Next, at step 508, the program maps the vectors corresponding to the identified two-color tiles into the sphere in RGB space, as shown in FIG. 5. Each of the vectors projects from the center of the sphere, which also coincides with vertex (0,0,0). To identify the clusters of vectors, the following potential function is first evaluated at step 510 at each of normalized sample points $SP_{norm}$ on the sample sphere:

$$F(SP_{norm}) = \sum_{i=1}^{N} \frac{|V_i|}{\text{dist}(SP_{norm}, V_i)^m}, \quad \text{(Eq. 10)}$$

where $\text{dist}(s,t_i)$ refers to the distance between sample point $SP_{norm}$ and $V_i$, m is a clustering parameter, which can be selected between values 2 and 3, for example, to make the potential function F more "sensitive" at sample points to allow the potential function to better discriminate between close and remote vectors $V_i$. The potential function F has larger values at sample points that are closer to vector points $V_i$.

Next, at step 512, the program determines if a local maximum of $F(SP_{norm})$ exists inside cluster cones. A sample point $SP_{norm}$ is a local maximum point if $F(SP_{norm}) \geq F(SP_{norm(i)})$, for all sample points $SP_{norm(i)}$ that are inside the cone having a predetermined angle $\theta_{clus}$ and axis $SP_{norm}$; that is, the angle between $SP_{norm}$ and $SP_{norm(i)}$ is less than $\theta_{clus}$:

$$(SP_{norm} \cdot SP_{norm(i)})/(|SP_{norm}|*|SP_{norm(i)}|) < \cos\theta_{clus} \quad \text{(Eq. 11)}$$

If found, the program then at step 514 defines a cluster $C(SP_{norm})$, which contains the set of vectors $V_i$ that fall inside the cone having angle $\theta_{clus}$ and axis $SP_{norm}$.

At step 516, it is determined if the cluster $C(SP_{norm})$ contains a predetermined minimum number NX of vectors. If the number of vectors exceeds or equals NX, then the cluster $C(SP_{norm})$ is marked as "significant" and stored at step 518. Otherwise, the cluster is marked as insignificant. Next, the program at step 520 excludes all sample points $SP_{norm(l)}$ and vectors $V_i$ falling within the considered cone from further processing. The program then proceeds to step 512 to find the next local maximum of the potential function F. This process is repeated until no more local maxima of the potential function are found since all sample points have been considered.

Tiles that correspond to the identified significant clusters are marked as text tiles, whereas tiles corresponding to the non-significant clusters are marked as picture tiles.

Referring to FIG. 8, the step of creating a set of uniformly distributed sample points SP (step 504 in FIG. 7) on the unit sphere is described.

The algorithm described uses an electrostatic model—if $M_{samp}$ similar electrical charges are allowed to slide on a spherical surface, they will spread uniformly over the surface so that the total energy of the system is minimal.

First, at step 402, a step size $s_{iter}$ is defined as follows:

$$s_{iter} = \arcsin(\theta_0) \tag{Eq. 12}$$

where $\theta_0$ is the precision angle tolerance. For example, $\theta_0$ can be set at 1°, in which case the sample point spherical coordinates are defined in 1° increments along any direction. The step size $s_{iter}$ determines the amount of movement of the sample points for each iteration of the sample point determination process.

Next, at step 404, $M_{samp}$ sample points $\{SP_1, SP_2, \ldots SP_{Msamp}\}$, where $$SP_i = (\rho_i, \phi_i, \theta_i), \tag{Eq. 13}$$

are initially defined in the unit sphere. $\rho_i, \phi_i$, and $\theta_i$ are the spherical coordinates, with $\rho_i = 1$ for a unit sphere. $M_{samp}$ (the number of sample points) is determined by a parameter $\alpha$, which is the maximum allowed angular distance along the $\theta$ axis between any two sample points.

$$M_{samp} = [180/\alpha] \ast [360/\alpha]. \tag{Eq. 14}$$

The sample points can be initially randomly positioned in the sphere under the condition that all sample points are different and do not belong to the same plane. Alternatively, they can be initialized as points with spherical coordinates ($\rho=1$, $\phi=j\ast\alpha$, $\theta=k\ast\alpha$), $j=1, \ldots [180/\alpha]$, and $k=1, \ldots, [360/\alpha]$.

The goal to be achieved is to find the distribution of sample points that provides the least amount of energy. Thus, at step 406, a point $SP_i$ is selected that has the maximum normal force $G_{norm}$ (normal to the vector $SP_i$).

$$G_{norm} = G_{total} - SP_i \ast |G_{total}| \ast \cos\beta, \tag{Eq. 15}$$

where $$G_{total} = \sum_{\substack{j=1 \\ j \neq i}}^{N} (SP_i - SP_j) / |SP_i - SP_j|^3, \tag{Eq. 16}$$

and $\beta$ is the angle between vectors $SP_i$ and $G_{total}$.

At step 408, the program determines if $G_{norm}$ is equal to zero. If so, then no more energy reduction is necessary and the program exits. However, if $G_{norm}$ has a non-zero value, the program at step 410 creates a test point. $SP_{i,test}$:

$$SP_{i,test} = SP_i + s_{iter} \ast G_{norm} / |G_{norm}|. \tag{Eq. 17}$$

The test point is essentially the point $SP_i$ moved by a step $s_{iter}$ in the direction of $G_{norm}$.

Next, at step 412, the energy change $\Delta E_i$ between $SP_i$ and $SP_{i,test}$ is calculated as follows:

$$\Delta E_i = \sum_{\substack{j=1 \\ j \neq i}}^{N} (1/r_{j,test} - 1/r_{j,i}), \tag{Eq. 18}$$

where $r_{j,i}$ is the distance between $SP_j$ and $SP_i$, and $r_{j,test}$ is the distance between $SP_j$ and $SP_{i,test}$.

The program then determines at step 414 if the energy change $\Delta E_i$ is less than zero. If not, then that indicates moving $SP_{i,test}$ would either increase the energy or the energy would remain the same. In that case, the program exits as no more energy reduction is possible.

If however, an energy reduction has been achieved (i.e., $\Delta E_i < 0$), then $SP_i$ is moved to $SP_{i,test}$ $$SP_i = SP_{i,test}. \tag{Eq. 19}$$

From step 416, the program returns to step 406 and the process is repeated until either $G_{norm} = 0$ or no more energy reduction can be achieved.

Figure 10:
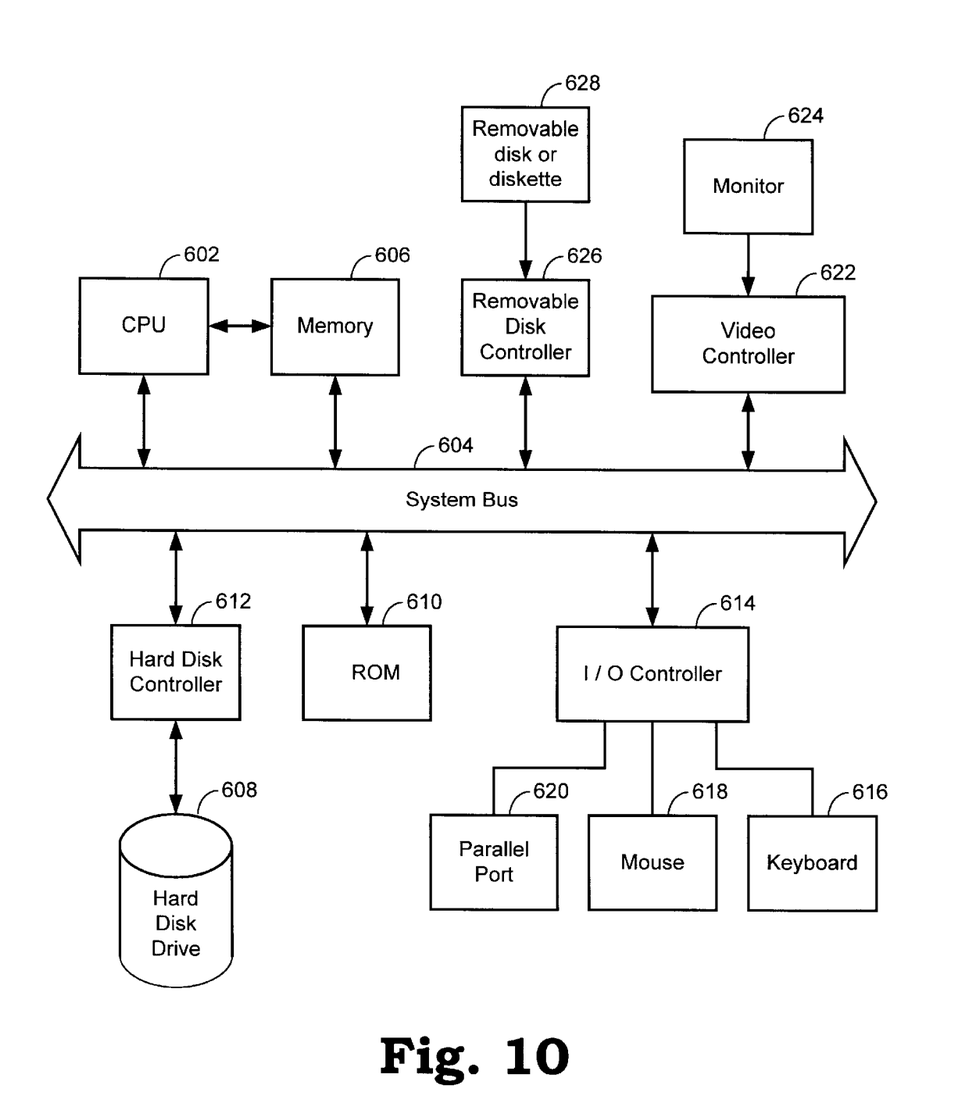
FIG. 10 is a block diagram of a computer system.

Referring now to FIG. 10, the text recognition program may be implemented in digital electronic circuitry or in computer hardware, firmware, software, or in combinations of them, such as in a computer system. The computer includes a central processing unit (CPU) 602 connected to an internal system bus 604. The storage media in the computer system include a main memory 606 (which can be implemented with dynamic random access memory devices), a hard disk drive 608 for mass storage, and a read-only memory (ROM) 610. The main memory 606 and ROM 610 are connected to the bus 604, and the hard disk drive 608 is coupled to the bus 604 through a hard disk drive controller 612.

Apparatus of the invention may be implemented in a computer program product tangibly embodied in a machine-readable storage device (such as the hard disk drive 608, main memory 606, or ROM 610) for execution by the CPU 602. Suitable processors include, by way of example, both general and special purpose microprocessors. Generally, a processor will receive instructions and data from the read-only memory 610 and/or the main memory 606. Storage devices suitable for tangibly embodying computer programming instructions include all forms of non-volatile memory, including by way of example semiconductor memory devices, such as EPROM, EEPROM, and flash memory devices; magnetic disks 528 connected through a controller 626 such as the internal hard disk drive 608 and removable disks and diskettes; magneto-optical disks; and CD-ROM disks. Any of the foregoing may be supplemented by, or incorporated in specially-designed ASICs (application-specific integrated circuits).

The computer system further includes an input-output (I/O) controller 614 connected to the bus 604 and which provides a keyboard interface 616 for connection to an external keyboard, a mouse interface 618 for connection to an external mouse or other pointer device, and a parallel port interface 620 for connection to a printer. In addition, the bus 604 is connected to a video controller 622 which couples to an external computer monitor or a display 624. Data associated with an image for display on a computer monitor 624. Data associated with an image for display on a computer monitor 624 are provided over the system bus 604 by application programs to the video controller 622 through the operating system and the appropriate device driver.

Other embodiments are also within the scope of the following claims. For example, the order of steps of the invention may be changed by those skilled in the art and still achieve desirable results. The various thresholds and parameters can be modified. Different methods of representing the color distribution of each of the tiles (other than using vectors) in the multicolor page can be used.

What is claimed is:

1. A computer-implemented method recognizing text in a multicolor image stored in a computer, the multicolor image comprising a plurality of pixels, each pixel having an associated color, the method comprising:

separating the image into multiple blocks;

analyzing color distributions of the pixels in each of the blocks;

identifying blocks having two main colors;

grouping two-color blocks having similar colors into two-color zones;

identifying text in the two-color zones;

mapping the pixels of each block to a three-dimensional color space;

defining, for each two-color block, a cylinder that encloses the pixels, the cylinder having a height and a radius;

classifying a block as a text block if the ratio of the radius to the height is less than a predefined value, wherein the text identifying step is performed in the text blocks.

2. The method of claim 1, further comprising:

converting the two colors in each zone to black and white to produce a black and white image.

3. The method of claim 2, further comprising:

performing optical character recognition of the black and white image.

4. The method of claim 1, wherein the predefined value is approximately 0.35.

5. The method of claim 1, wherein the image is stored in the computer as a raster of pixels, the method further comprising:

representing each block as a vector in a three-dimensional color space, the vector originating at a point in a first group of pixels corresponding to a first color and terminating at a point in a second group of pixels corresponding to a second color;

identifying clusters of vectors that point generally in the same directions; and marking blocks corresponding to clusters that contain more than a predefined number of vectors as text blocks.

6. The method of claim 5, wherein the cluster-identifying step includes:

defining sample points on a sphere in the three-dimensional color space;

identifying a local maximum of a predefined function at a sample point; and grouping the vectors within a predetermined angle of the sample point into a cluster.

7. The method of claim 6, wherein the sample points are uniformly distributed on the sphere.

8. A computer program residing on a computer-readable medium for recognizing text in a multicolor image, the multicolor image comprising a plurality of pixels, each pixel having an associated color, the computer program comprising instructions for causing the computer to:

separate the image into multiple blocks;

analyze color distributions of each of the blocks;

identify blocks having two main colors;

group two-color blocks having similar colors into two-color zones; and identify text in the two-color zones;

map the pixels of each block to a three-dimensional color space;

define, for each two-color block, a cylinder that encloses the pixels, the cylinder having a height and a radius; and classify a block as a text block if the ratio of the radius to the height is less than a predefined value, wherein the text is identified in the text blocks.

9. The computer program of claim 8, further comprising instructions for causing the computer to:

convert the two colors in each zone to black and white to produce a black and white image.

10. The computer program of claim 9, further comprising instructions for causing the computer to:

perform optical character recognition of the black and white image.

11. The computer program of claim 8, wherein the predefined value is approximately 0.35.

12. The computer program of claim 8, wherein the image is stored in the computer as a raster of pixels, the computer program further comprising instructions for causing the computer to:

represent each block as a vector in a three-dimensional color space, the vector originating at a point in a first group of pixels corresponding to a first color and terminating at a point in a second group of pixels corresponding to a second color;

identify clusters of vectors that point generally in the same directions; and mark blocks corresponding to clusters that contain more than a predefined number of vectors as text blocks.

13. The computer program of claim 12, wherein the cluster-identifying step includes:

defining sample points on a sphere in the three-dimensional color space;

identifying a local maximum of a predefined function at a sample point; and grouping the vectors within a predetermined angle of the sample point into a cluster.

14. The computer program of claim 13, wherein the sample points are uniformly distributed on the sphere.

15. Apparatus to recognize text in a multicolor image, the multicolor image comprising a plurality of pixels, each pixel having an associated color, the apparatus comprising:

storage medium to store the image; and a processor operatively coupled to the storage medium and configured to:

separate the image into multiple blocks;

analyze color distributions of each of the blocks;

identify blocks having two main colors;

group two-color blocks having similar colors into two-color zones; and identify text in the two-color zones;

map the pixels of each block to a three-dimensional color space;

define, for each two-color block, a cylinder that encloses the pixels, the cylinder having a height and a radius; and classify a block as a text block if the ratio of the radius to the height is less than a predefined value, wherein the text identifying step is performed in the text blocks.

16. The apparatus of claim 15, wherein the processor is further configured to:

convert the two colors in each zone to black and white to produce a black and white image.

17. The apparatus of claim 15, wherein the image is stored in the computer as a raster of pixels, and wherein the processor is further configured to:

represent each block as a vector in a three-dimensional color space, the vector originating at a point in a first group of pixels corresponding to a first color and terminating at a point in a second group of pixels corresponding to a second color;

identify clusters of vectors that point generally in the same directions; and mark blocks corresponding to clusters that contain more than a predefined number of vectors as text blocks.

18. A computer-implemented method recognizing text in a multicolor image stored in a computer, the multicolor image comprising a plurality of pixels, each pixel having an associated color, the method comprising:

separating the image into multiple blocks;

analyzing color distributions of each of the blocks;

identifying blocks having two main colors;

grouping two-color blocks having similar colors into two-color zones;

identifying text in the two-color zones;

representing each block as a vector in a three-dimensional color space, the vector originating at a point in a first group of pixels corresponding to a first color and terminating at a point in a second group of pixels corresponding to a second color;

identifying clusters of vectors that point generally in the same directions; and marking blocks corresponding to clusters that contain more than a predefined number of vectors as text blocks.

19. The method of claim 18, wherein the cluster-identifying step includes:

defining sample points on a sphere in the three-dimensional color space;

identifying a local maximum of a predefined function at a sample point; and grouping the vectors within a predetermined angle of the sample point into a cluster.

20. The method of claim 19, wherein the sample points are uniformly distributed on the sphere.

21. A computer program residing on a computer-readable medium for recognizing text in a multicolor image, the multicolor image comprising a plurality of pixels, each pixel having an associated color, the computer program comprising instructions for causing the computer to:

separate the image into multiple blocks;

analyze color distributions of each of the blocks;

identify blocks having two main colors;

group two-color blocks having similar colors into two-color zones;

identify text in the two-color zones;

represent each block as a vector in a three-dimensional color space, the vector originating at a point in a first group of pixels corresponding to a first color and terminating at a point in a second group of pixels corresponding to a second color;

identify clusters of vectors that point generally in the same directions; and mark blocks corresponding to clusters that contain more than a predefined number of vectors as text blocks.

22. The computer program of claim 21, wherein the cluster-identifying step includes:

defining sample points on a sphere in the three-dimensional color space;

identifying a local maximum of a predefined function at a sample point; and grouping the vectors within a predetermined angle of the sample point into a cluster.

23. The computer program of claim 22, wherein the sample points are uniformly distributed on the sphere.

24. Apparatus to recognize text in a multicolor image, the multicolor image comprising a plurality of pixels, each pixel having an associated color, the apparatus comprising:

storage medium to store the image; and a processor operatively coupled to the storage medium and configured to:

separate the image into multiple blocks;

analyze color distributions of each of the blocks;

identify blocks having two main colors;

group two-color blocks having similar colors into two-color zones;

identify text in the two-color zones;

represent each block as a vector in a three-dimensional color space, the vector originating at a point in a first group of pixels corresponding to a first color and terminating at a point in a second group of pixels corresponding to a second color;

identify clusters of vectors that point generally in the same directions; and mark blocks corresponding to clusters that contain more than a predefined number of vectors as text blocks.

* * * * *